US009383284B2

(12) United States Patent
Miyashita

(10) Patent No.: US 9,383,284 B2
(45) Date of Patent: Jul. 5, 2016

(54) DIAPHRAGM-TYPE PRESSURE GAUGE

(71) Applicant: CANON ANELVA CORPORATION, Asao-ku, Kawasaki-shi (JP)

(72) Inventor: Haruzo Miyashita, Machida (JP)

(73) Assignee: CANON ANELVA CORPORATION, Kawasaki-Shi, Kanagawa-Ken (JP)

( * ) Notice: Subject to any disclaimer, the term of this patent is extended or adjusted under 35 U.S.C. 154(b) by 155 days.

(21) Appl. No.: 14/244,382

(22) Filed: Apr. 3, 2014

(65) Prior Publication Data
US 2014/0208859 A1 Jul. 31, 2014

Related U.S. Application Data

(63) Continuation of application No. PCT/JP2012/005803, filed on Sep. 12, 2012.

(30) Foreign Application Priority Data

Oct. 5, 2011 (JP) ................................. 2011-220565

(51) Int. Cl.
G01L 9/12 (2006.01)
G01L 9/00 (2006.01)
G01L 15/00 (2006.01)
(52) U.S. Cl.
CPC ................. G01L 9/12 (2013.01); G01L 9/0073 (2013.01); G01L 15/00 (2013.01)
(58) Field of Classification Search
CPC ....... G01L 9/0072; G01L 7/00; G01L 13/025; G01L 9/0075
USPC ............ 73/718, 715, 716, 717, 723, 724, 700
See application file for complete search history.

(56) References Cited

U.S. PATENT DOCUMENTS

| 5,515,711 A * | 5/1996 | Hinkle .................. G01L 27/005 73/1.58 |
| 2002/0011114 A1* | 1/2002 | Miyashita ............. G01L 9/0042 73/718 |
| 2005/0114070 A1* | 5/2005 | Dozoretz ................ G01L 13/00 702/140 |

FOREIGN PATENT DOCUMENTS

| JP | 60-49438 | 4/1985 |
| JP | 2001-255225 | 9/2001 |

(Continued)

OTHER PUBLICATIONS

*International Search Report (PCT/ISA/210) mailed on Nov. 20, 2012, by the Japanese Patent Office as the International Searching Authority for International Application No. PCT/JP2012/005803.

(Continued)

Primary Examiner — Lisa Caputo
Assistant Examiner — Nigel Plumb
(74) Attorney, Agent, or Firm — Buchanan Ingersoll & Rooney PC

(57) ABSTRACT

A pressure gauge includes a first sensor for detecting a pressure in a first range, a second sensor for detecting a pressure in a second range, and a processing unit for determining a pressure value based on outputs from the first sensor and the second sensor. The first and the second ranges have an overlapping range, an upper limit of the second range is higher than that of the first range, the processing unit determines a correction value based on outputs from the first sensor and the second sensor when a pressure falls within the overlapping range, and the processing unit determines a pressure value based on an output from the second sensor and the correction value, when measuring, by using the second sensor, a pressure in the second range, higher than that of the first pressure range.

6 Claims, 11 Drawing Sheets

(56) References Cited

FOREIGN PATENT DOCUMENTS

| | | |
|---|---|---|
| JP | 2003-21566 | 1/2003 |
| JP | 2007-512535 | 5/2007 |
| JP | 2009-53164 | 3/2009 |

OTHER PUBLICATIONS

*Written Opinion (PCT/ISA/237) mailed on Nov. 20, 2012, by the Japanese Patent Office as the International Searching Authority for International Application No. PCT/JP2012/005803.

* cited by examiner

DIAPHRAGM-TYPE PRESSURE GAUGE

This application is a continuation of International Patent Application No. PCT/JP2012/005803 filed on Sep. 12, 2012, and claims priority to Japanese Patent Application No. 2011-220565 filed on Oct. 5, 2011, the entire content of both of which is incorporated herein by reference.

TECHNICAL FIELD

The present invention relates to a diaphragm-type pressure gauge and, more particularly, to a diaphragm-type pressure gauge having a widened measurement pressure range.

BACKGROUND ART

In a process of manufacturing electronic components or semiconductor products, forming thin films and etching in a vacuum apparatus are indispensable processes. In this case, it is a general practice to proceed with the process while keeping the internal pressure of the vacuum apparatus constant. As a pressure gauge for measuring the internal pressure of the vacuum apparatus in the process, a diaphragm-type pressure gauge is often used, which can perform accurate pressure measurement regardless of the type of gas.

FIG. 10 is a view showing an example of the structure of a conventional diaphragm-type pressure gauge (PTL 1). A diaphragm-type pressure gauge with such a single diaphragm structure has a pressure measurement range of two to four orders of magnitudes. This is because the amount of displacement of the diaphragm is very small on the low pressure range side, and a variation of the diaphragm is not proportional to a pressure on the high pressure range side. For this reason, when measuring a wider pressure range with such a diaphragm-type pressure gauge, it is necessary to perform pressure measurement by preparing a plurality of diaphragm-type pressure gauges having different measurement pressure ranges and individually measuring output voltages from the respective pressure gauges. The diaphragm-type pressure gauge disclosed in PTL 1 includes a correction electrode 10 located at a position out of the center of a diaphragm electrode 4 (diaphragm-type pressure detection element) so as to face it. The capacitance detected by a fixed electrode 5 is corrected by the capacitance detected by the correction electrode 10 to reduce the influence of an ambient temperature on pressure measurement. Even with the function of this correction electrode, however, output voltage fluctuations due to ambient temperature fluctuations are unavoidable. For this reason, the diaphragm-type pressure gauge includes a potentiometer or switch for modifying the fluctuation amount.

On the other hand, as shown in FIG. 11, a diaphragm-type pressure gauge having two diaphragm-type pressure detection elements (PTL 2) is known. The diaphragm-type pressure gauge disclosed in PTL 2 is manufactured by a micro-machine technique using a semiconductor manufacturing process technique. A vacuum sensor chip having an insulating substrate 13 bonded to a silicon substrate 14 (constituted by an elastic structure 8 and a rigid structure 11) has a size of about several mm to several 10 mm and a thickness of about 1 mm. Combining the two diaphragm-type pressure detection elements having different measurement ranges makes it possible to measure a wider pressure range with a single diaphragm-type pressure gauge. A diaphragm-type pressure gauge like that disclosed in PTL 2 is generally configured to correct a capacitance influenced by ambient temperature fluctuations for each diaphragm-type pressure element by using the correction electrodes respectively provided for the two diaphragm-type pressure detection elements.

CITATION LIST

Patent Literature

PTL 1: U.S. Pat. No. 5,515,711
PTL 2: Japanese Patent Laid-Open No. 2001-255225

SUMMARY OF INVENTION

Technical Problem

However, since the diaphragm-type pressure gauge disclosed in PTL 2 includes two diaphragm-type pressure detection elements, there are two pressure values to be measured in a range where the diaphragm-type pressure detection elements which output measurement values are switched. For this reason, some diaphragm-type pressure gauge entrusts selection of a measurement value to be used to the user in a range where the diaphragm-type pressure detection elements are switched. However, in a range where the diaphragm-type pressure detection elements are switched, since the diaphragm-type pressure detection element which detects a high pressure range is inferior in measurement accuracy, a measurement value error is relatively large. In order to solve such a problem, there is proposed a method of performing calculation by averaging two pressure values in a switching range or assigning weights and outputting the resultant value as one measurement value. However, further improvement is required in measurement accuracy.

It is an object of the present invention to provide a diaphragm-type pressure gauge in which a plurality of diaphragm-type pressure detection elements having different pressure measurement ranges are arranged in a housing, and good measurement accuracy is obtained in a range where the diaphragm-type pressure detection elements are switched.

Solution to Problem

A diaphragm-type pressure gauge of the present invention comprises a first sensor configured to measure a pressure in a first pressure range, a second sensor configured to measure a pressure in a second pressure range having an upper limit on a high pressure side relative to the first pressure range and an overlapping range with the first pressure range, and a computation unit configured to calculate a pressure value corresponding to outputs from the first sensor and the second sensor, wherein when the first sensor and the second sensor perform detection in the overlapping range, the computation unit calculates a first pressure value corresponding to a signal output from the first sensor and a second pressure value corresponding to a signal output from the second sensor, and calculates a signal value which is a value of a signal to be output from the second sensor and which corresponds to a difference between the first pressure value and the second pressure value, and wherein when measuring a pressure in the second pressure range which is higher than an upper limit of the first pressure range, the computation unit outputs a pressure value corresponding to a signal obtained by adding the signal value to the signal output from the second sensor.

Advantageous Effects of Invention

The present invention can provide a diaphragm-type pressure gauge in which a plurality of diaphragm-type pressure detection elements having different pressure detection ranges are arranged in a housing, and good measurement accuracy is obtained in a range where the diaphragm-type pressure detection elements are switched.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate exemplary embodiments of the invention and, together with the description, serve to explain the principles of the present invention.

DESCRIPTION OF EMBODIMENTS

Figure 1:
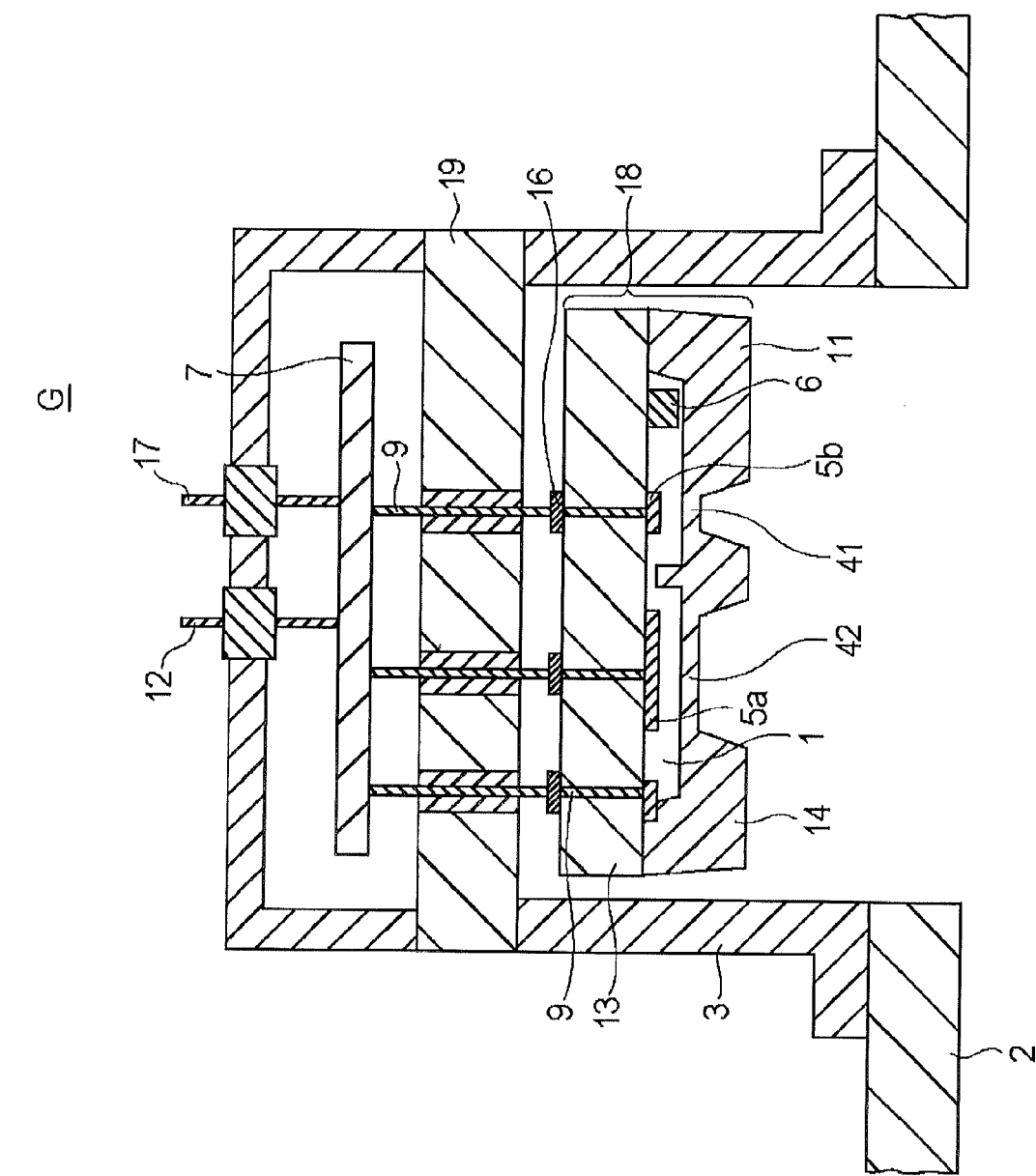
FIG. 1 is a schematic view of a diaphragm-type pressure gauge according to an embodiment of the present invention.

FIG. 1 shows a diaphragm-type pressure gauge G according to an embodiment of the present invention. The diaphragm-type pressure gauge G includes, as main constituent elements, a housing 3 whose internal space communicates with a vacuum apparatus 2, a diaphragm-type pressure detection unit 18 provided in the housing 3, and an electric circuit 7 which detects an output value from the diaphragm-type pressure detection unit 18 as a pressure value. The housing 3 and an electric input terminal 9 separate an atmosphere side space and a vacuum side space from each other. Diaphragm electrodes 41 and 42 of the diaphragm-type pressure detection unit 18 are arranged in the vacuum side space, and the electric circuit 7 is arranged in the atmosphere side space. The electric circuit 7 is connected to an external control apparatus or display apparatus via an electric output terminal 12. An I/O signal terminal 17 outputs, to the outside, information indicating whether the electrical signal output from the electric output terminal 12 is the output measured by either of fixed electrodes 5a or 5b.

It is possible to manufacture the diaphragm-type pressure detection unit 18 by, for example, a micromachine technique using a semiconductor manufacturing process technique. The plurality of diaphragm electrodes 41 and 42 are formed on the single silicon substrate. The diaphragm electrodes 41 and 42 have detection sensitivity with respect to different pressure ranges. The plurality of diaphragm electrodes 41 and 42 have different areas to have different pressure detection ranges. The fixed electrodes 5b and 5a are arranged on an insulating substrate 13 so as to face the diaphragm electrodes 41 and 42, respectively. The gauge detects a pressure based on the capacitances between the fixed electrodes 5b and 5a and the diaphragm electrodes 41 and 42. The fixed electrode 5a and the diaphragm electrode 42 constitute one diaphragm-type pressure detection element (a low pressure side sensor or first sensor). The fixed electrode 5b and the diaphragm electrode 41 constitute the other diaphragm-type pressure detection element (a high pressure range sensor or second sensor).

The diaphragm electrode 42 functioning as part of a low pressure side sensor (first sensor) has high sensitivity in a low pressure range (first pressure range). The diaphragm electrode 41 functioning as part of a high pressure range sensor (second sensor) has high sensitivity in a high pressure range (second pressure range). Although described later, in this embodiment, the range in which the low pressure side sensor outputs pressure measurement results is 0.01 Pa to 100 Pa, and the range in which the high pressure range sensor outputs pressure measurement results is 100 Pa to 100,000 Pa. Note however that the range in which the low pressure side sensor and the high pressure range sensor can perform pressure measurement (the first and second pressure ranges) is wider than the range in which each sensor can output pressure measurement results. The first and second pressure ranges have an overlapping range.

Figure 2:
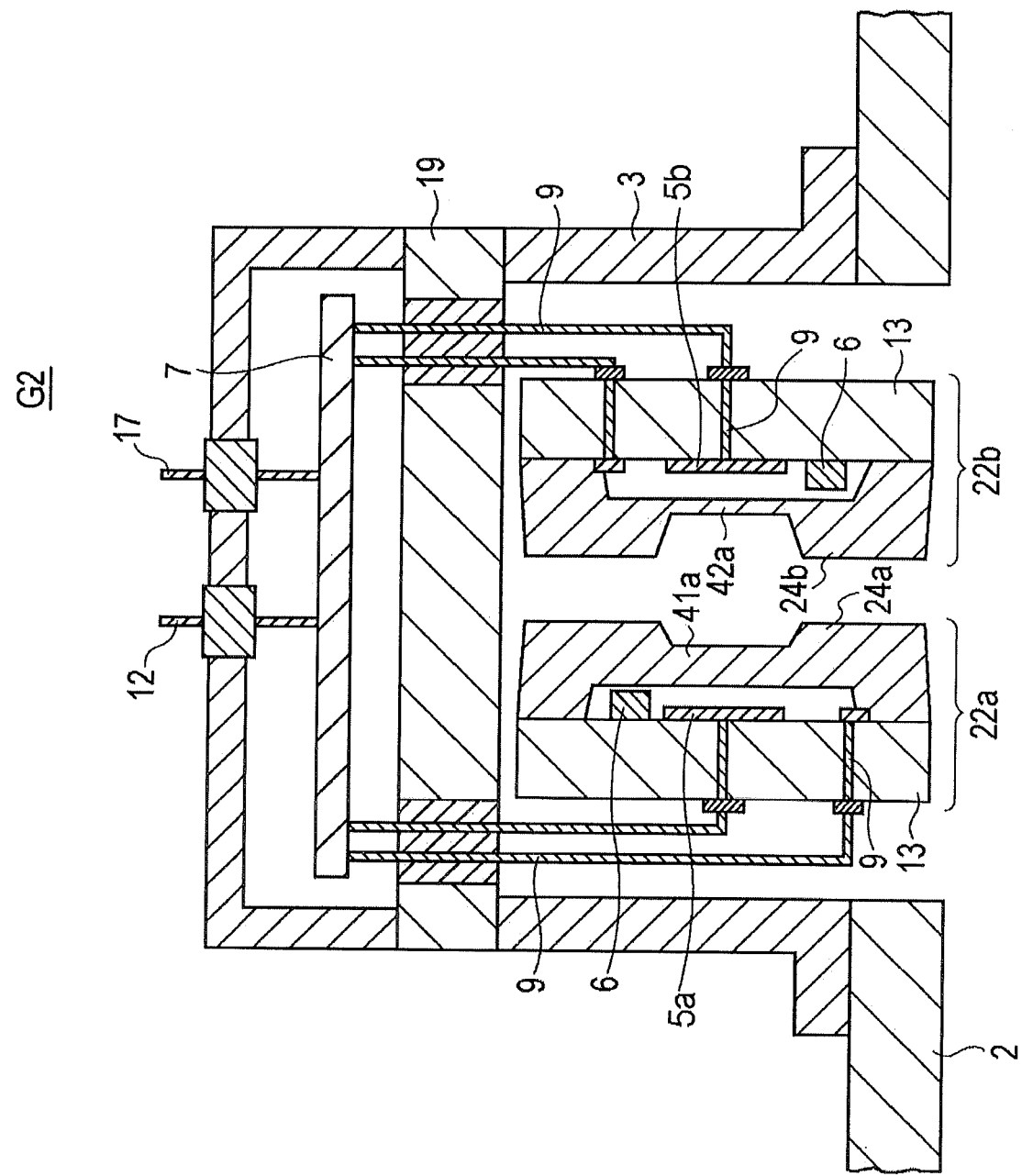
FIG. 2 is a schematic view of a diaphragm-type pressure gauge according to another embodiment of the present invention.

FIG. 2 shows a diaphragm-type pressure gauge G2 according to another embodiment of the present invention. The diaphragm-type pressure gauge G2 differs from the diaphragm-type pressure gauge G shown in FIG. 1 in that it includes two mutually separated diaphragm-type pressure detection elements. Diaphragm-type pressure detection elements 22a and 22b are respectively formed on silicon substrates 24a and 24b which are independent of each other. Diaphragm electrodes 41a and 42a have different thicknesses to make the diaphragm-type pressure detection elements 22a and 22b have different pressure detection ranges. Note that the diaphragm electrodes 41a and 42a may have the same area.

Figure 4:
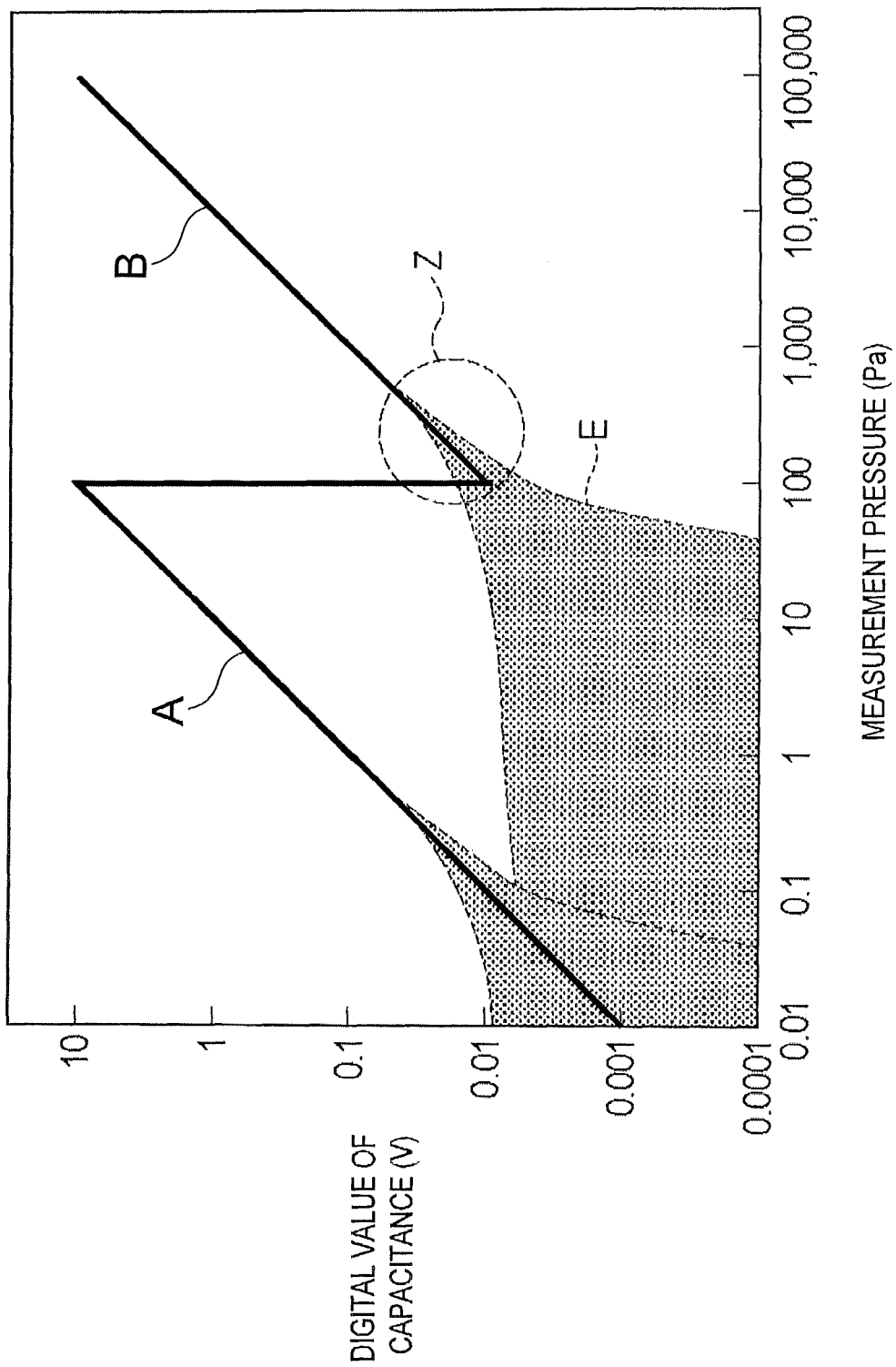
FIG. 4 is a graph showing the relationship between measurement pressures and the digital values of capacitances according to the embodiment of the present invention.
Figure 5:
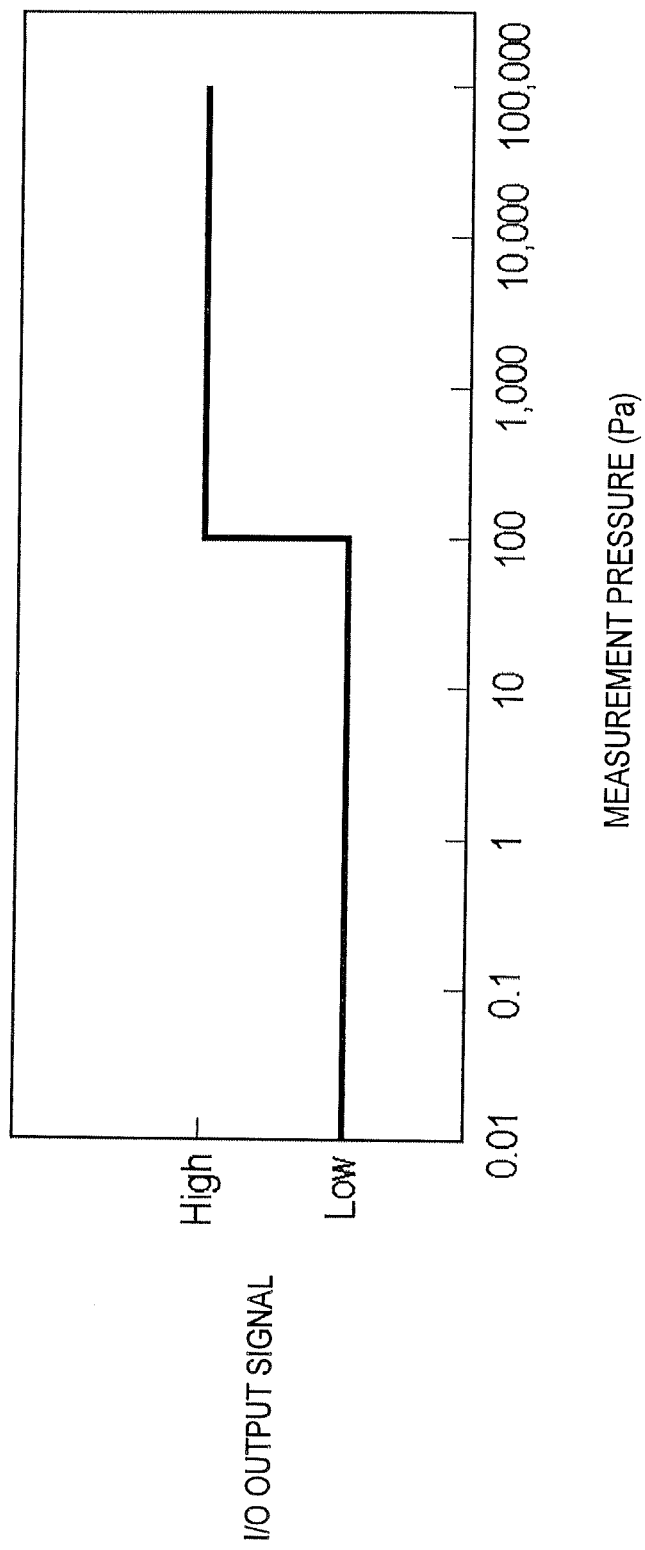
FIG. 5 is a graph showing the relationship between measurement pressures from the diaphragm-type pressure gauge and I/O output signals according to the embodiment of the present invention.

Referring to FIG. 2, assume that the diaphragm electrode 42a has a size of 7 mm square, and the distance between the diaphragm electrode 42a and a fixed electrode 5a is 9 μm. In this case, if the diaphragm electrode 42a has a thickness of 22 μm, it is possible to obtain the diaphragm-type pressure detection element 22b with a full scale pressure of 100 Pa. Likewise, assume that the diaphragm electrode 41a has a size of 7 mm square, the distance between the diaphragm electrode 41a and a fixed electrode 5b is 9 μm, and the diaphragm electrode 41a has a thickness of 200 μm. In this case, it is possible to obtain the diaphragm-type pressure detection element 22a with a full scale pressure of 100,000 Pa. Although the diaphragm-type pressure detection elements 22b and 22a can be manufactured by a micromachine technique, the same effect can be obtained by using diaphragm-type pressure detection elements manufactured by a machining process. Although the diaphragm-type pressure gauge G has been described with reference to FIGS. 4 and 5, the description of the "diaphragm electrodes 41 and 42", which has been made with reference to FIGS. 4 and 5, is read as that of the "diaphragm electrodes 41a and 42a" of the diaphragm-type pressure gauge G2.

Figure 3:
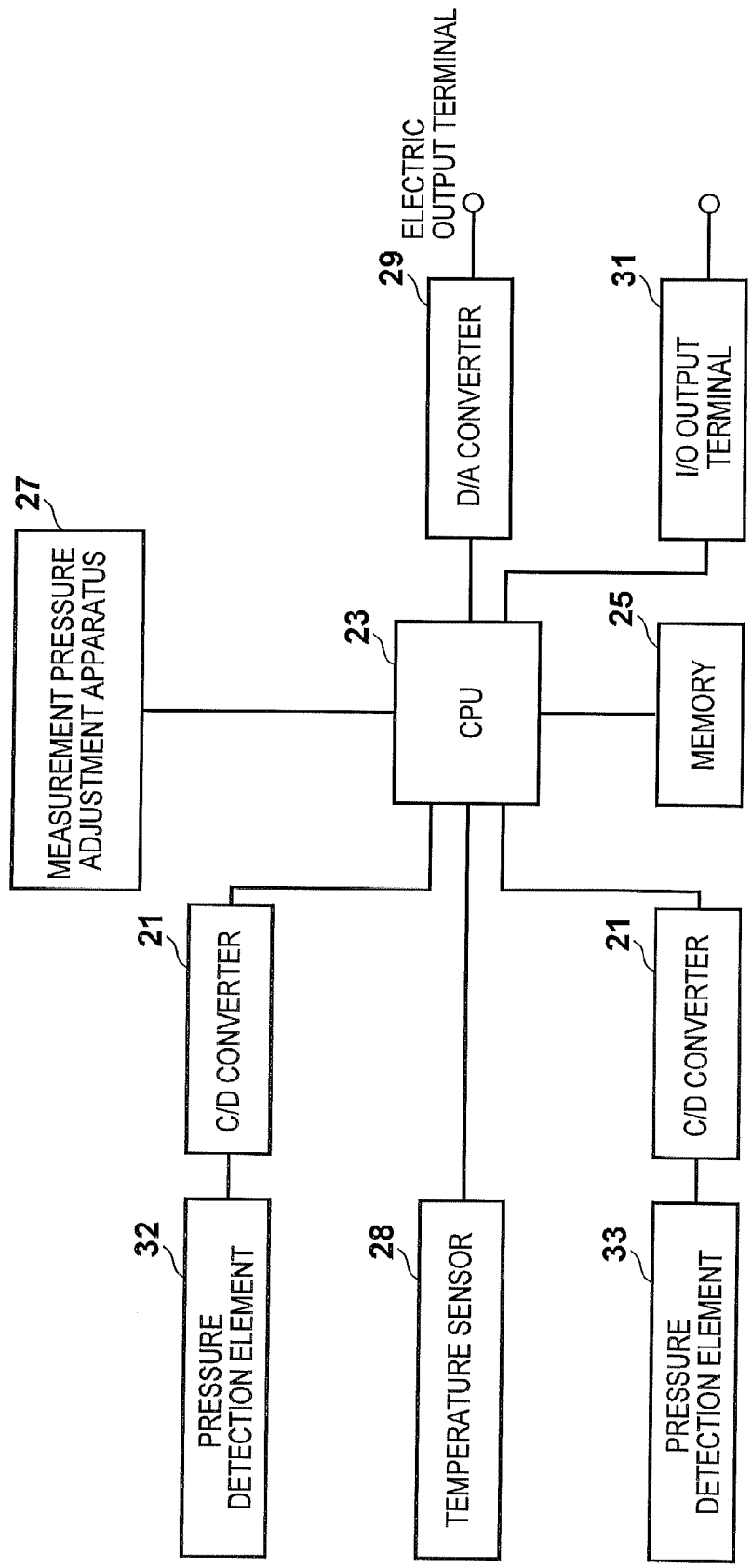
FIG. 3 is a block diagram showing the system configuration of a diaphragm-type pressure gauge G according to an embodiment of the present invention.

FIG. 3 is a block diagram showing the system configuration of the diaphragm-type pressure gauge G. A control circuit for the diaphragm-type pressure gauge G includes diaphragm-type pressure detection elements 32 and 33, C/D converters 21, a CPU (Central Processing Unit) 23, a temperature sensor 28, a measurement pressure adjustment apparatus 27, a memory 25, a D/A converter 29, and an I/O output terminal 31. The diaphragm-type pressure detection element 32 has a capacitor structure (low pressure side sensor) constituted by the diaphragm electrode 42 and the fixed electrode 5a in the diaphragm-type pressure gauge G. The diaphragm-type pressure detection element 33 has a capacitor structure (high pressure range sensor) constituted by the diaphragm electrode 41 and the fixed electrode 5b in the diaphragm-type pressure gauge G. On the other hand, in the diaphragm-type pressure gauge G2, the diaphragm-type pressure detection element 32 has a capacitor structure constituted by the diaphragm electrode 42a and the fixed electrode 5a, and the diaphragm-type pressure detection element 33 has a capacitor structure constituted by the diaphragm electrode 41a and the fixed electrode 5b. The C/D converters 21 are respectively provided for the pressure detection elements 32 and 33, and are configured to convert the capacitance values output from the pressure detection elements 32 and 33 into digital values. The memory 25 is a storage apparatus allowing the CPU 23 to perform write access and read access. The D/A converter 29 converts the digital value output from the CPU 23 into an analog value.

The C/D converters 21 convert the analog signals (capacitance values) output from the pressure detection elements 32 and 33 into digital values (the digital values of the capacitance values) and send them to the CPU 23. The CPU 23 converts a digital value indicating the capacitance value supplied from the C/D converter 21 into a digital value indicating a pressure value by performing processing based on the measurement value obtained by the temperature sensor 28 and signals from the measurement pressure adjustment apparatus 27 and the memory 25, and sends the digital value to the D/A converter 29. The D/A converter 29 outputs an output signal (a voltage value indicating a pressure value) corresponding to the digital value indicating the input pressure value, as an analog value, from the electric output terminal 12. At this time, the D/A converter 29 also outputs information indicating that the signal output from the electric output terminal 12 is the output measured by a specific one of the pressure detection elements 32 and 33 from the I/O output terminal 31 to the outside.

The number of the diaphragm electrodes 41 and 42 of the diaphragm-type pressure detection element 18 is not limited to two, and may be three or more. When the pressure detection elements 32 and 33 output pressure values as capacitance values (an output from the first sensor or second sensor), the pressure detection elements 32 and 33 are connected to the C/D converters 21 which convert capacitance values into digital values. In addition, if the pressure detection elements 32 and 33 are elements for outputting pressure values as voltage values, the pressure detection elements 32 and 33 are connected to A/D converters instead of the C/D converters 21 to supply digital values indicating voltage values to the CPU 23.

Outputs from the pressure detection elements 32 and 33 can change due to changes in ambient temperature in addition to pressure. For this reason, this pressure gauge collects the output characteristics of digital values for each ambient temperature (detected by the temperature sensor 28 in FIG. 3) of the pressure detection elements 32 and 33 as data in advance and stores the temperature characteristic data in the memory 25. Note that the measurement pressure adjustment apparatus 27 will be described later.

FIG. 4 is a graph showing the relationship between measurement pressures and the digital values of capacitance values output from each C/D converter 21. Referring to FIG. 4, characteristic A indicates the output characteristic of a pressure detection element with a full scale pressure of 100 Pa, and characteristic B indicates the output characteristic of a pressure detection element with a full scale pressure of 100,000 Pa. In the diaphragm-type pressure gauges G and G2, characteristic A indicates an output from the pressure detection element (the low pressure side sensor or first sensor) having the fixed electrode 5a, and characteristic B indicates an output from the pressure detection element (the high pressure range sensor or second sensor) having the fixed electrode 5b. In a range with a measurement pressure higher than 100 Pa, the CPU 23 processes an output signal (the digital value of a capacitance) indicating the pressure detected by the pressure detection element having the fixed electrode 5b with a full scale pressure of 100,000 Pa, thereby generating a digital value indicating a pressure value. In a range with a measurement pressure lower than 100 Pa, the CPU 23 processes an output signal (the digital value of a capacitance) indicating the pressure detected by the pressure detection element having the fixed electrode 5a with a full scale pressure of 100 Pa, thereby generating a digital value indicating a pressure value. The D/A converter 29 outputs the digital value indicating the pressure value, as a voltage value (analog value) indicating the output value, from the output terminal. The CPU 23 corrects the digital value indicating the pressure value based on a signal indicating the temperature provided from the temperature sensor 28 and temperature characteristic data in the memory 25, and outputs the corrected value. That is, the CPU 23 outputs a digital value indicating the pressure value whose error due to an ambient temperature is reduced. The D/A converter 29 therefore outputs, from the output terminal, the value (pressure value) whose error due to the ambient temperature is reduced.

As a result, the diaphragm-type pressure gauge G has a pressure-output voltage characteristic like that shown in FIG. 4. The diaphragm-type pressure gauge G outputs the I/O output signal shown in FIG. 5 from the I/O output terminal 31. This I/O output signal indicates that the output terminal of the D/A converter 29 has output a detection result from a specific one of the pressure detection elements respectively having the fixed electrode 5a and the fixed electrode 5b. Referring to FIG. 5, a low voltage (Low) indicates an I/O output signal when the D/A converter 29 has output a detection result (first pressure value) from the low pressure side pressure detection element (fixed electrode 5a). A high voltage (High) indicates an I/O output signal when the D/A converter 29 has output a detection result (second pressure value) from the high pressure range pressure detection element (fixed electrode 5b). Note that the pressure detection elements indicated by I/O output signals may be opposite to those described above without any problem.

A range E indicated in gray in FIG. 4 indicates the range in which detection pressure values (the digital values of capacitances) from the pressure detection elements 32 and 33, which are output from the D/A converter 29, fluctuate when an ambient temperature fluctuates by ±10° C. Obviously, measurement errors in measurement pressures are large near 100 Pa to 1,000 Pa indicated by a range Z in FIG. 4. In addition, the high pressure range pressure detection element (fixed electrode 5b) can perform pressure measurement although errors are large in the range of 100 Pa or less. That is, the overlapping range of the high pressure range pressure detection element and the low pressure side pressure detection element is a range equal to or less than 100 Pa (0 to 100 Pa). The diaphragm-type pressure gauge G is therefore configured to always correct a detection pressure value (the digital value of a capacitance or second pressure value) from the high pressure range pressure detection element (fixed electrode 5b) based on a detection pressure value (the digital value of a capacitance or first pressure value) from the low pressure side pressure detection element (fixed electrode 5a) in the pressure range of measurement pressures equal to or less than 100 Pa.

Figure 6:
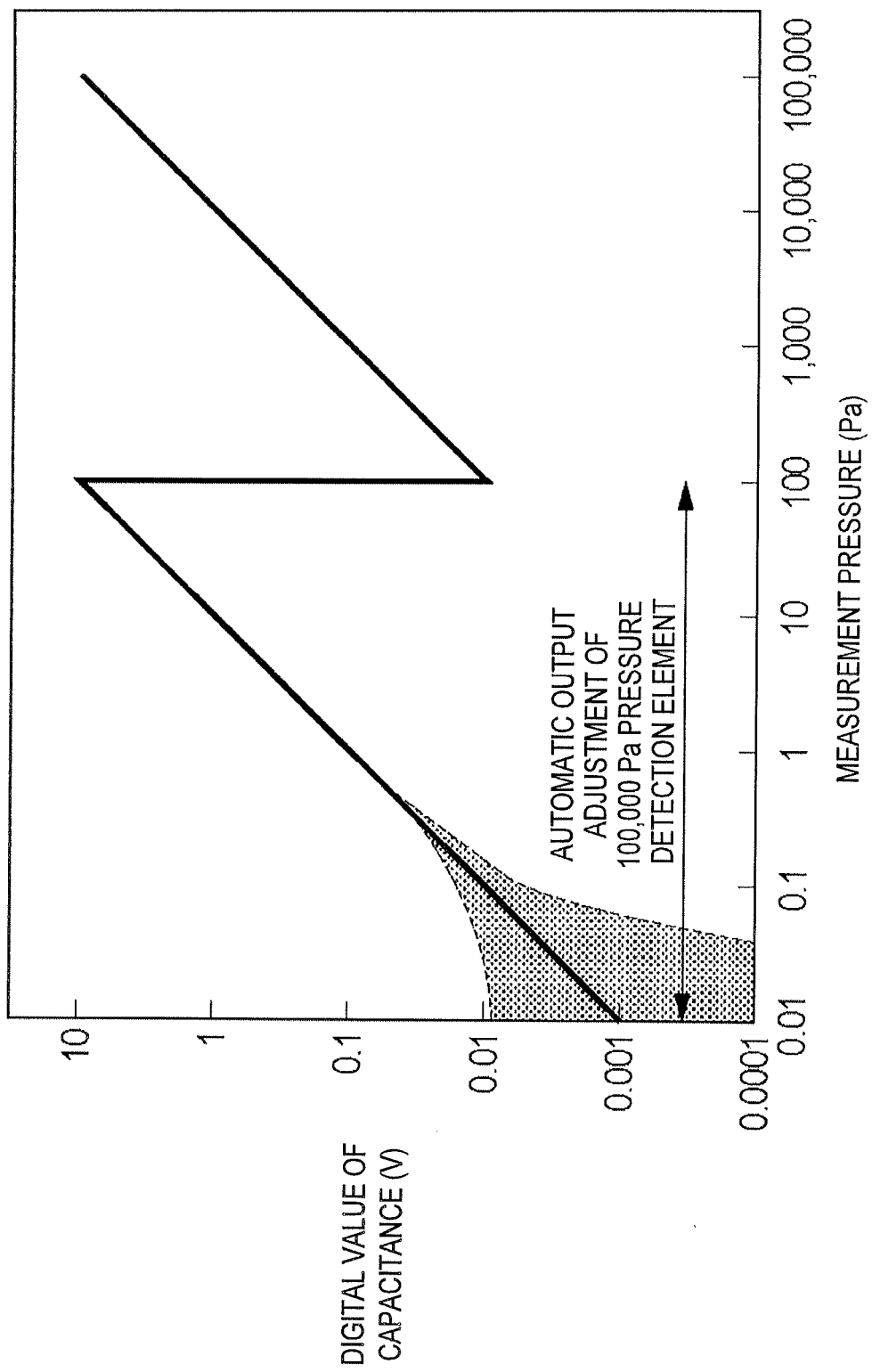
FIG. 6 is a graph showing the relationship between measurement pressures and the digital values of capacitances according to the embodiment of the present invention.

FIG. 6 is a graph showing the relationship between measurement pressures and the digital values of capacitances output from the CPU 23. The pressure gauge corrects the digital value of a capacitance from the pressure detection element having the fixed electrode 5b based on the digital value of a capacitance from the pressure detection element having the fixed electrode 5a. With this correction, as shown in FIG. 6, the diaphragm-type pressure gauge G increases the accuracy of a detection pressure value (the digital value of a capacitance) from pressure detection element (fixed electrode 5b) on the high pressure range near measurement pressures of 100 Pa to 1,000 Pa. A specific arrangement for correcting a detection output value (second pressure value) from the fixed electrode 5b will be described later.

Figure 7:
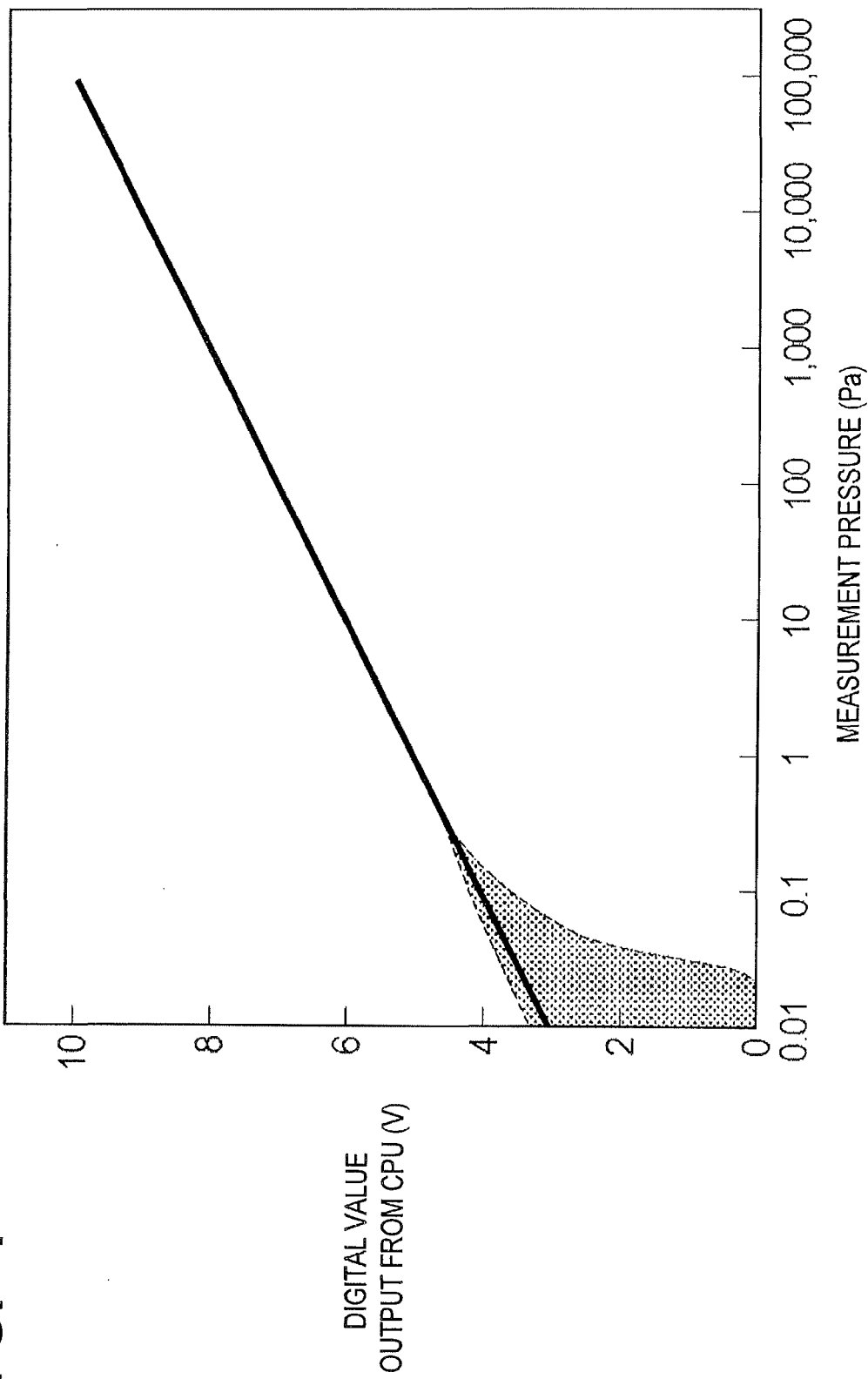
FIG. 7 is a graph showing the relationship between measurement pressures from the diaphragm-type pressure gauge and the digital values of pressures according to the embodiment of the present invention.

On the other hand, as shown in FIG. 7, the diaphragm-type pressure gauge G can be configured to make the digital values of pressures output from the CPU 23 have a linear relationship with the logarithmic values of pressures in the entire measurement pressure range. More specifically, the CPU 23 outputs the digital value of a pressure upon converting a pressure change in output voltage on one order of magnitude on the ordinate in FIG. 4 (the digital value of a capacitance) into a 0.5-V output voltage change. Although the gray portion in FIG. 7 shows an example of pressure measurement errors caused by ambient temperature fluctuations, since FIG. 7 shows pressures calculated based on the characteristic in FIG. 6, an increase in pressure measurement error near 100 Pa to 1,000 Pa shown in FIG. 6 is eliminated.

The measurement pressure adjustment apparatus 27 (external input unit) will be described below. The measurement pressure adjustment apparatus 27 is an apparatus which forcibly adjusts a pressure measurement error in a region with low measurement pressures equal to or less than 1/10 of the full scale pressure of the gauge, and is connected to the CPU 23 as shown in FIG. 3. For example, the pressure gauge can reduce a pressure measurement error at the measurement of a pressure of 1 Pa or less by adjusting a measurement pressure of 0.01 Pa or less so as to forcibly set the digital value of the pressure output from the CPU 23 to the D/A converter 29 to 0 to 0.001 V. More specifically, upon receiving a signal from the measurement pressure adjustment apparatus 27, the CPU 23 adjusts the digital value of the pressure output from the D/A converter 29 to 0 to 0.001 V. A condition for making the measurement pressure adjustment apparatus 27 output a signal to the CPU 23 is, for example, the time when the user presses a push button provided on the measurement pressure adjustment apparatus 27.

That is, the measurement pressure adjustment apparatus 27 is an apparatus which is used by the user to forcibly set a pressure value from the outside. If, for example, an error has occurred concerning the zero point of the diaphragm-type pressure gauge G, the user evacuates the vacuum chamber to a sufficiently low pressure and presses the push button or adjusts a trimmer and forcibly resets a pressure measurement value of the low pressure side sensor (diaphragm electrode 42) to a predetermined pressure value. Since the measurement pressure adjustment apparatus 27 is configured to include the push button, the user can easily adjust the zero point. This improves operability.

When a pressure is 0.01 Pa or less, it is possible to detect it by using, for example, a vacuum gauge for high vacuum pressure measurement such as a B-A gauge. In some case, it is possible to estimate or measure the time taken to set a pressure to 0.01 Pa or less based on the arrangement of an evacuation system and the size of a vacuum chamber, and to arrange the push button so that it may be pressed during that time. Obviously, the pressure gauge may be configured so as to make the measurement pressure adjustment apparatus 27 output a signal to the CPU 23 when the vacuum gauge detects a pressure becomes a 0.01 Pa or less.

An output voltage from the diaphragm-type pressure gauge G can be a negative value in a low pressure range. That is, an output voltage value from the diaphragm-type pressure gauge G becomes a negative output in a pressure range with a pressure of 0.1 Pa or less, and the gauge may indicate an unrealistic measurement result (a negative pressure value). For this reason, the CPU 23 can be configured to operate the measurement pressure adjustment apparatus 27 to correct, upon calculating a pressure measurement value as a negative value, the error between its actual pressure value and a measurement pressure by forcibly converting the pressure value into a positive value (for example, 0.0001 Pa) as close as to zero as possible.

Figure 8:
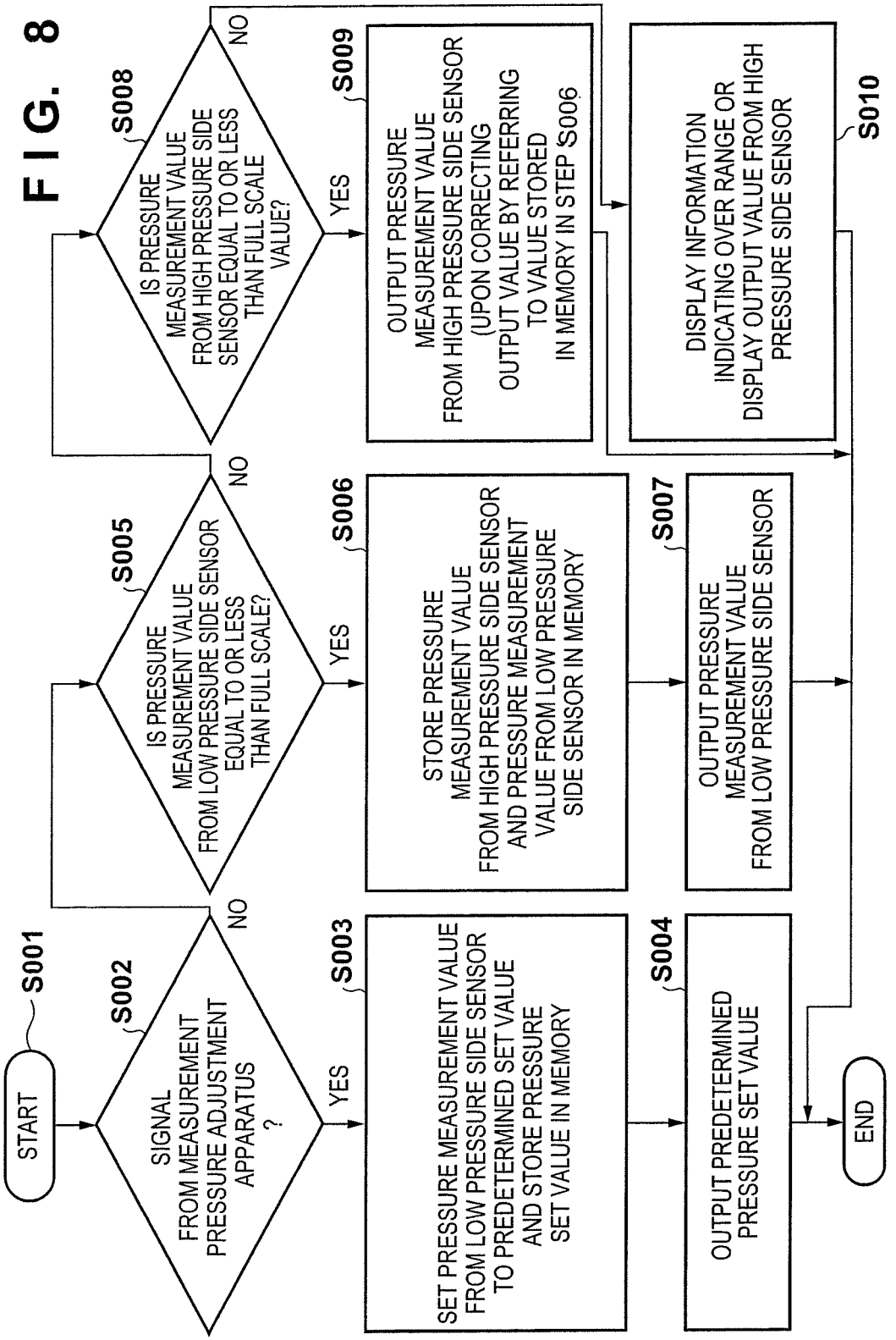
FIG. 8 is a flowchart for the diaphragm-type pressure gauge according to the embodiment of the present invention.

An arrangement for correcting a detection output value from the pressure detection element having the fixed electrode 5b will be described next. FIG. 8 is a flowchart for correcting a detection output value from the pressure detection element having the fixed electrode 5b. Note that in the description with reference to FIG. 8, a "pressure measurement value" is, for example, a detection output value (the digital value of a capacitance), and is a value (first and second pressure values) proportional to capacitances from the fixed electrodes 5a and 5b. When the diaphragm-type pressure gauge G starts measurement (step S001), the CPU 23 determines in step S002 whether the measurement pressure adjustment apparatus 27 (external input unit) has issued an instruction. If YES in step S002, the process advances to step S003. In step S003, the CPU 23 forcibly sets a pressure measurement value from the low pressure side sensor (the pressure detection element having the fixed electrode 5a) to a predetermined pressure set value, stores the predetermined pressure set value in the memory 25, and outputs the pressure measurement value to the display apparatus, personal computer, and the like in step S004.

A case in which the measurement pressure adjustment apparatus 27 is used as a zero point setting unit will be described below. If a predetermined pressure set value is 0.01 Pa, the CPU 23 outputs a pressure measurement value from the low pressure side sensor (fixed electrode 5a) as the digital value of a pressure corresponding to the 0.01 Pa in step S004. In this embodiment, when the measurement pressure adjustment apparatus 27 operates, the CPU 23 outputs the digital value of a pressure corresponding to 0.01 Pa to the D/A converter, and stores a pressure measurement value from the low pressure side sensor (fixed electrode 5a) at this time as a pressure measurement value corresponding to 0.01 Pa in the memory 25. In the embodiment, a predetermined pressure set value is 0.01 Pa. Obviously, however, this value may be set to 0 Pa or 0.001 Pa. When using the measurement pressure adjustment apparatus 27 as a unit other than a zero point setting unit, the user changes this predetermined pressure set value.

If NO in step S002, the CPU 23 determines in step S005 whether a pressure measurement value from the low pressure side sensor (fixed electrode 5a) is equal to or less than the full scale (100 Pa). If YES in step S005, the process advances to step S006. In step S006, the CPU 23 stores, in the memory 25, the correction value (the signal value corresponding to a pressure difference) which is calculated from (a) a pressure value calculated from a pressure measurement value from the pressure detection element (high pressure range sensor or second sensor) having the fixed electrode 5b and (b) a pressure measurement value from the pressure detection element (the low pressure side sensor or first sensor) having the fixed electrode 5a. In step S009 (to be described later), the CPU 23 corrects the pressure measurement value from the high pressure range sensor (the pressure detection element having the fixed electrode 5b) by using the correction value and the pressure measurement value from the low pressure side sensor in step S005. More specifically, the CPU 23 corrects the pressure measurement value from the high pressure range sensor by adding the correction value to it. In step S007, the CPU 23 outputs the digital value of a pressure corresponding to the pressure measurement value from the low pressure side sensor (the pressure detection element having the fixed electrode 5a). In step S007, since the CPU 23 refers to data from the temperature sensor 25 and data in the memory, the digital value of the pressure output from the CPU 23 has undergone correction of the influence of an ambient temperature.

If NO in step S005, the process advances to step S008. In step S008, the CPU 23 determines whether the pressure measurement value from the high pressure range sensor (the pressure detection element having the fixed electrode 5b) is equal to or less than the full scale (100,000 Pa). If YES in step S008, the process advances to step S009. In step S009, the CPU 23 corrects the pressure value calculated from the pressure measurement value from the high pressure range sensor (fixed electrode 5b) by using the correction value stored in the memory 25 in step S006, and outputs the resultant value from the output terminal of the D/A converter 29. If NO in step S008, the process advances to step S010. In step S010, the CPU 23 outputs an over-range signal or the measurement pressure value of the high pressure range sensor. Note that the CPU 23 always repeatedly executes the processing in the above flowchart (steps S001 to END).

Figure 9:
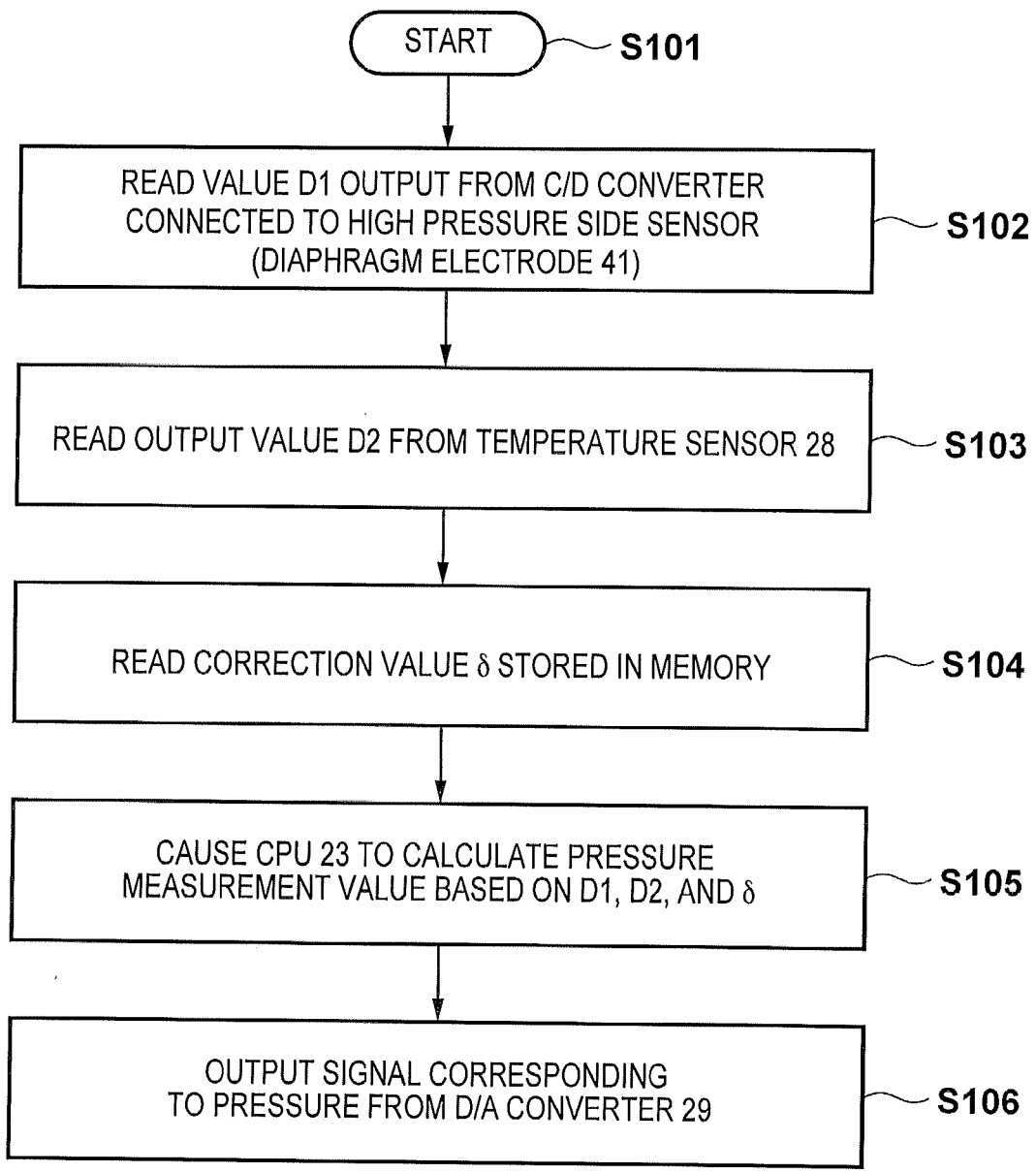
FIG. 9 is a flowchart of processing in step S009 in FIG. 8.
Figure 10:
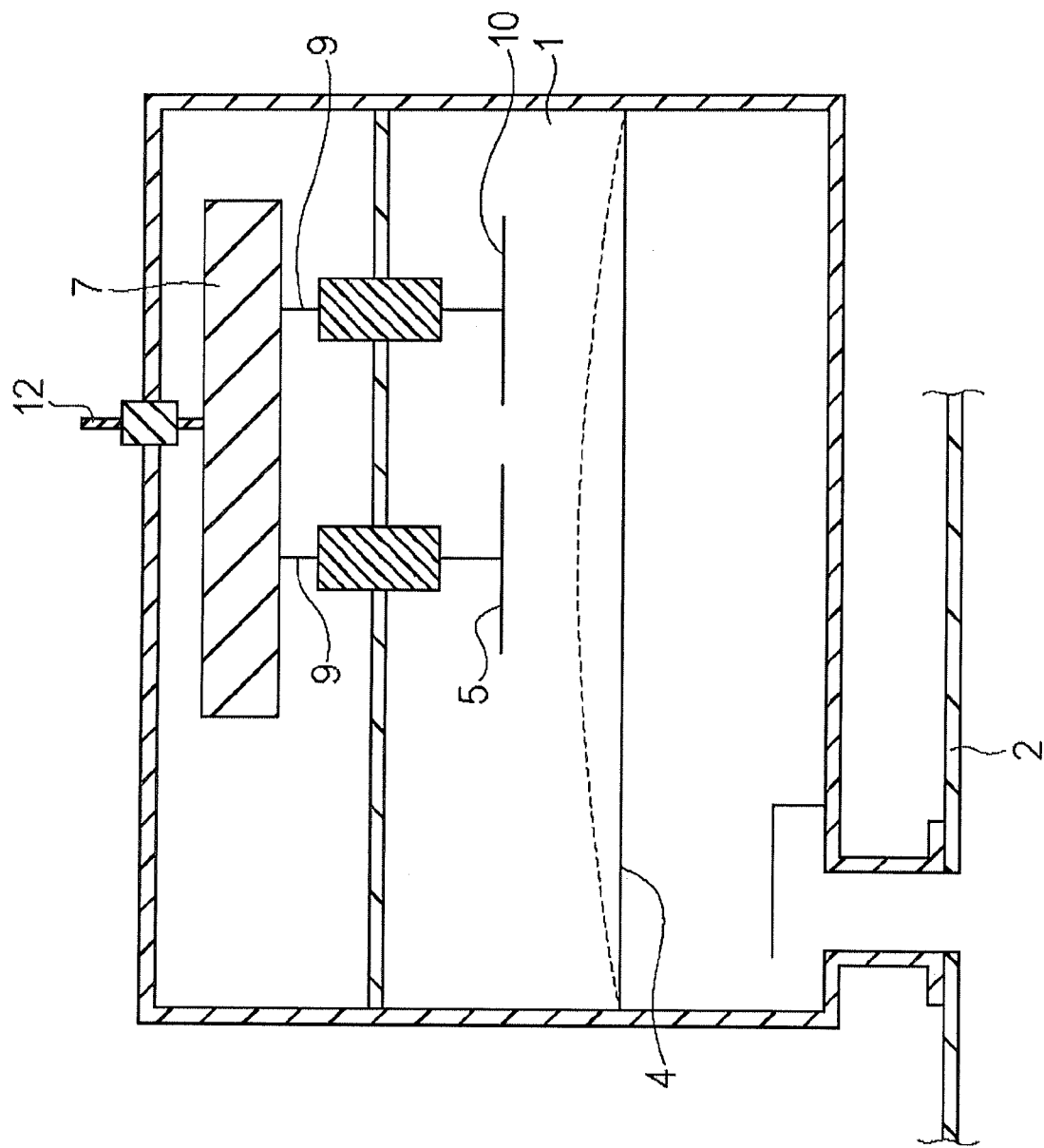
FIG. 10 is a schematic view showing an example of the structure of a conventional diaphragm-type pressure gauge.
Figure 11:
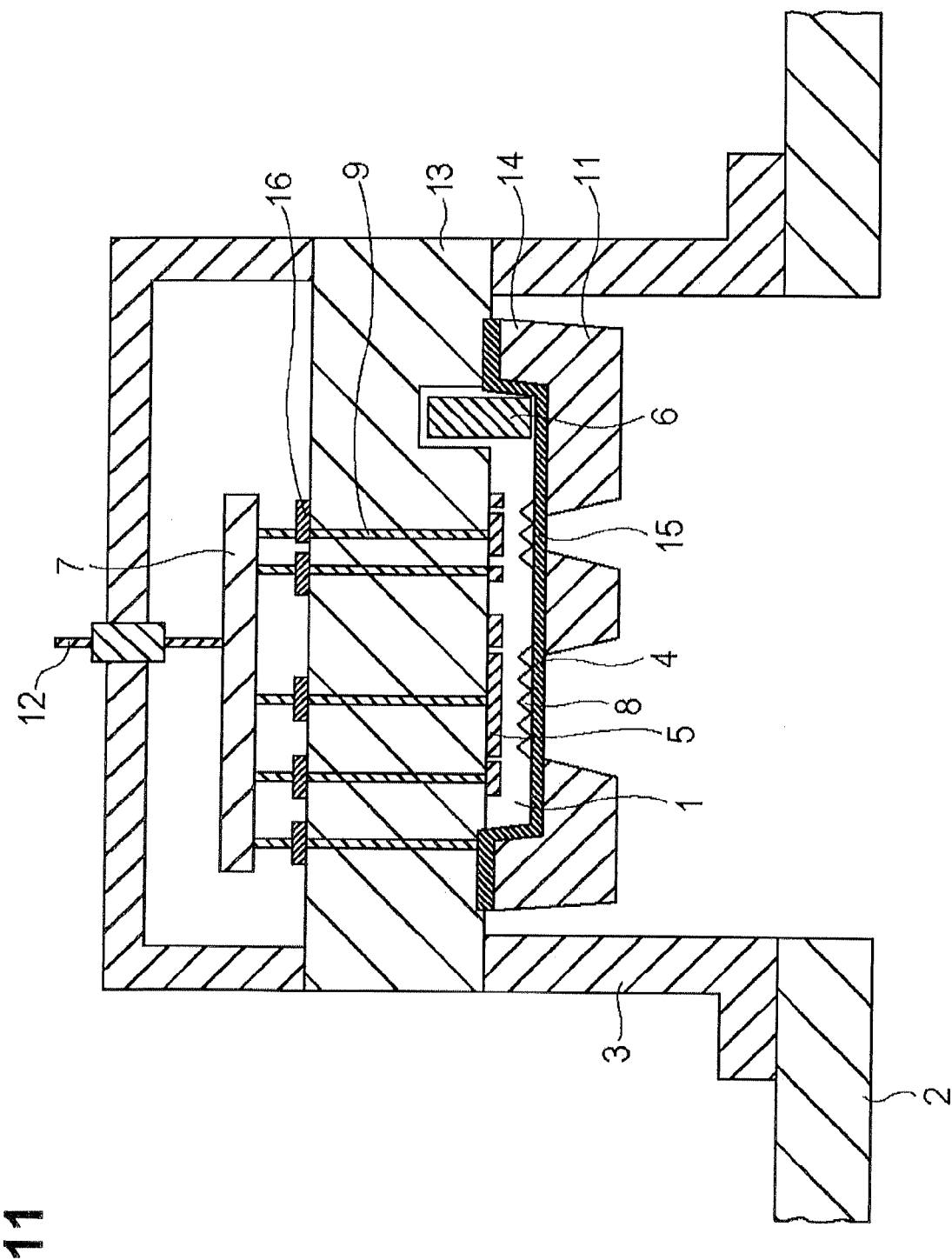
FIG. 11 is a schematic view showing another example of the structure of a conventional diaphragm-type pressure gauge.

The correction processing in step S009 will be described below with reference to FIG. 9. FIG. 9 is a flowchart for the processing in step S009. First of all, the CPU 23 reads a value D1 output from the C/D converter 21 connected to the high pressure range sensor (the pressure detection element having the fixed electrode 5b) 33 (step S102). The CPU 23 then reads an output value D2 from the temperature sensor 28 and a correction value δ stored in the memory 25 (steps S103 and S104). The CPU 23 calculates a pressure value based on the values of D1, D2, and δ (step S105), and outputs the pressure value to the outside via the D/A converter 29 (step S106). In this case, the CPU 23 overwrites the memory 25 with the latest correction value δ every time the low pressure side sensor 32 operates. That is, the CPU 23 updates the correction value δ every time the pressure in a measurement atmosphere decreases to the measurement pressure range of the low pressure side sensor 32, and hence the pressure measurement value in the pressure range in which the high pressure range sensor 33 operates becomes stable and accurate.

A specific arrangement for correcting a pressure value from the high pressure range sensor 33 will be described next.

As described above, the correction value (signal value) δ is a signal value which is a value of a signal to be output from the high pressure range sensor 33 and which corresponds to the difference between (a) the pressure value calculated from a pressure measurement value from the low pressure side sensor 32 when the sensor 32 performs measurement for an arbitrary pressure in the measurement pressure range of the low pressure side sensor 32, and (b) the pressure value calculated from a pressure measurement value from the high pressure range sensor 33 when the sensor 33 performs measurement for the arbitrary pressure. A procedure for acquiring the correction value δ will be described. First of all, the pressure value converted from the digital value (the digital value of a capacitance) output from the C/D converter 21 for the low pressure side sensor 32 is determined as a pressure measurement value (first pressure value) from the low pressure side sensor 32. On the other hand, the pressure value converted from the digital value (the digital value of a capacitance) output from the C/D converter 21 for the high pressure range sensor 33 is determined as a pressure measurement value (second pressure value) from the high pressure range sensor 33. The CPU 23 acquires the difference between a pressure measurement value from the low pressure side sensor 32 and a pressure measurement value from the high pressure range sensor 33. The correction value (signal value) δ is the value obtained by converting the difference between the pressure measurement value from the low pressure side sensor 32 and the pressure measurement value from the high pressure range sensor 33 into a digital value output from the high pressure range sensor 33.

Although the pressure (predetermined pressure) measured at the time of acquiring the correction value (signal value) δ can be an arbitrary pressure in the measurement pressure range (first pressure range) of the low pressure side sensor 32, the pressure is preferably a value near the pressure at which the low pressure side sensor 32 is switched to the high pressure range sensor 33, that is, a value near the upper limit of the measurement pressure range of the low pressure side sensor 32. This is because a measurement error in the high pressure range sensor 33 can be minimized. Note that since the measurement pressure range of the low pressure side sensor 32 in this embodiment is 100 Pa or less, the pressure (predetermined pressure) measured at the time of acquiring the correction value δ is preferably 100 Pa. This makes it possible to minimize an error in the high pressure range sensor 33 at the pressure (100 Pa) at which the value to be output from the D/A converter 29 is switched from the measurement value based on the low pressure side sensor 32 to the measurement value based on the high pressure range sensor 33.

This embodiment has exemplified the case in which the number of pressure detection elements (capacitor structures constituted by diaphragm electrodes and fixed electrodes) is two. The present invention can be applied to an arrangement having three or more diaphragm electrodes, which can more accurately obtain a pressure in a wider range.

According to the diaphragm-type pressure gauge of the present invention, since a measurement pressure for acquiring a correction value can be one arbitrary pressure in the measurement pressure range of the low pressure side sensor, the pressure gauge can be configured to facilitate correction value acquiring operation and ensure high accuracy throughout a wide pressure range with a relatively simple apparatus arrangement. In addition, it is possible to facilitate correcting operation by automatically acquiring a correction value when the pressure in a space which is measured by the diaphragm-type pressure gauge of the present invention passes through the pressure (100 Pa in the above embodiment) at which the measurement value based on the low pressure side sensor is switched to the measurement value based on the high pressure range sensor. This makes it possible to provide a user-friendly diaphragm-type pressure gauge.

A single diaphragm-type pressure gauge of the present invention can measure a pressure in a wide range. It is possible to correct a measurement error due to ambient temperature fluctuations. In addition, using the measurement pressure adjustment apparatus 27 can prevent a measurement pressure from becoming a negative value and adjust a self output voltage value.

The present invention is not limited to the above embodiments and various changes and modifications can be made within the spirit and scope of the present invention. Therefore, to apprise the public of the scope of the present invention, the following claims are made.

REFERENCE SIGNS LIST

G, G2: diaphragm-type pressure gauge, 1: reference pressure chamber, 2: vacuum apparatus, 3: housing, 4, 4a, 41, 42, 41a, 42a: diaphragm electrode; 5: fixed electrode; 6: getter, 7: electric circuit, 8: elastic structure, 9: conductive wiring, 10: correction electrode, 11: rigid structure, 12: electric output terminal, 13: insulating substrate, 14, 24: silicon substrate, 15: projection structure, 16: electrode pad, 17: I/O output terminal, 18, 22: diaphragm-type pressure detection element, 19: input terminal, 21: C/D converter, 23: CPU, 25: memory, 27: measurement pressure adjustment apparatus, 28: temperature sensor, 29: D/A converter, 31: I/O output terminal, 32, 33: pressure detection element

The invention claimed is:

1. A diaphragm-type pressure gauge, comprising:
a first sensor configured to measure a pressure in a first pressure range;
a second sensor configured to measure a pressure in a second pressure range having an upper limit on a high pressure side relative to the first pressure range and an overlapping range with the first pressure range, each of said first sensor and said second sensor being configured to measure a pressure relative to a reference pressure in a reference pressure chamber; and
a computation unit configured to calculate a pressure value corresponding to outputs from said first sensor and said second sensor,
wherein when said first sensor and said second sensor perform detection in the overlapping range, said computation unit calculates a first pressure value corresponding to a signal output from said first sensor and a second pressure value corresponding to a signal output from said second sensor, and calculates a signal value which is a value of a signal to be output from said second sensor and which corresponds to a difference between the first pressure value and the second pressure value, and
wherein when measuring a pressure in the second pressure range which is higher than an upper limit of the first pressure range, said computation unit outputs a pressure value corresponding to a signal obtained by adding the signal value to the signal output from said second sensor.

2. The diaphragm-type pressure gauge according to claim 1, wherein both the first pressure value and the second pressure value are measured with a pressure at the upper limit of the first pressure range.

3. The diaphragm-type pressure gauge according to claim 1, further comprising an external input unit connected to said computation unit, wherein said computation unit performs setting to calculate a signal output from said first sensor as a predetermined pressure value upon receiving a signal output from said external input unit.

4. The diaphragm-type pressure gauge according to claim 1, further comprising a storage unit connected to said computation unit,
wherein said computation unit stores, in said storage unit, the signal value from said second sensor, which corresponds to the difference, and
wherein said computation unit reads out the signal value from said storage unit and adds the signal value to a signal output from said second sensor, when measuring a pressure in the second pressure range which is higher than the upper limit of the first pressure range.

5. The diaphragm-type pressure gauge according to claim 4, wherein when a new signal value is stored in said storage unit, the signal value stored in said storage unit is overwritten with the new signal value.

6. A diaphragm-type pressure gauge, comprising:
a first sensor configured to detect a pressure in a first pressure range;
a second sensor configured to detect a pressure in a second pressure range, each of said first sensor and said second sensor being configured to measure a pressure relative to a reference pressure in a reference pressure chamber; and
a processing unit which determines a pressure value based on outputs from said first sensor and said second sensor,
wherein the first pressure range and the second pressure range have an overlapping range,
wherein an upper limit of the second pressure range is higher than an upper limit of the first pressure range,
wherein said processing unit determines a correction value based on outputs from said first sensor and said second sensor when a pressure falls within the overlapping range, and
wherein said processing unit determines a pressure value based on an output from said second sensor and the correction value, when measuring, by using said second sensor, a pressure in the second pressure range, which is higher than the upper limit of the first pressure range.

* * * * *